United States Patent
Li

(10) Patent No.: US 11,126,561 B2
(45) Date of Patent: Sep. 21, 2021

(54) METHOD AND SYSTEM FOR ORGANIZING NAND BLOCKS AND PLACING DATA TO FACILITATE HIGH-THROUGHPUT FOR RANDOM WRITES IN A SOLID STATE DRIVE

(71) Applicant: Alibaba Group Holding Limited, Grand Cayman (KY)

(72) Inventor: Shu Li, Bothell, WA (US)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 73 days.

(21) Appl. No.: 16/589,802

(22) Filed: Oct. 1, 2019

(65) Prior Publication Data

US 2021/0097003 A1    Apr. 1, 2021

(51) Int. Cl.
*G06F 12/1009* (2016.01)
*G06F 12/02* (2006.01)
*G06F 12/00* (2006.01)

(52) U.S. Cl.
CPC ...... *G06F 12/1009* (2013.01); *G06F 12/0253* (2013.01); *G06F 2212/1044* (2013.01); *G06F 2212/657* (2013.01)

(58) Field of Classification Search
CPC ............. G06F 12/1009; G06F 12/0253; G06F 2212/1044; G06F 2212/657
USPC ........................................................ 711/103
See application file for complete search history.

(56) References Cited

U.S. PATENT DOCUMENTS 3,893,071 A    7/1975 Bossen
4,562,494 A   12/1985 Bond
4,718,067 A    1/1988 Peters
4,775,932 A   10/1988 Oxley
4,858,040 A    8/1989 Hazebrouck
(Continued)

FOREIGN PATENT DOCUMENTS

JP    2003022209    1/2003
JP    2011175422    9/2011
(Continued)

OTHER PUBLICATIONS

S. Hong and D. Shin, "NAND Flash-Based Disk Cache Using SLC/MLC Combined Flash Memory," 2010 International Workshop on Storage Network Architecture and Parallel I/Os, Incline Village, NV, 2010, pp. 21-30.

(Continued)

*Primary Examiner* — Christopher B Shin
(74) *Attorney, Agent, or Firm* — Shun Yao; Park, Vaughan, Fleming & Dowler LLP

(57) ABSTRACT

One embodiment provides a system for facilitating data placement. The system receives, by a computing device, data to be written to a non-volatile memory, wherein the data is associated with a first logical block address. The system performs, based on the first logical block address, a search in a mapping table for an entry which indicates a first physical block address associated with a first physical unit. A respective physical unit can comprise a plurality of blocks of data across a plurality of channels of the non-volatile memory. The system writes the data to a second physical block address in the first physical unit. The system updates the entry by replacing the first physical block address with the second physical block address.

17 Claims, 8 Drawing Sheets

(56) References Cited

U.S. PATENT DOCUMENTS

| | | |
|---|---|---|
| 5,394,382 A | 2/1995 | Hu |
| 5,602,693 A | 2/1997 | Brunnett |
| 5,732,093 A | 3/1998 | Huang |
| 5,802,551 A | 9/1998 | Komatsu |
| 5,930,167 A | 7/1999 | Lee |
| 6,098,185 A | 8/2000 | Wilson |
| 6,148,377 A | 11/2000 | Carter |
| 6,226,650 B1 | 5/2001 | Mahajan et al. |
| 6,243,795 B1 | 6/2001 | Yang |
| 6,457,104 B1 | 9/2002 | Tremaine |
| 6,658,478 B1 | 12/2003 | Singhal |
| 6,795,894 B1 | 9/2004 | Neufeld |
| 7,351,072 B2 | 4/2008 | Muff |
| 7,565,454 B2 | 7/2009 | Zuberi |
| 7,599,139 B1 | 10/2009 | Bombet |
| 7,953,899 B1 | 5/2011 | Hooper |
| 7,958,433 B1 | 6/2011 | Yoon |
| 8,085,569 B2 | 12/2011 | Kim |
| 8,144,512 B2 | 3/2012 | Huang |
| 8,166,233 B2 | 4/2012 | Schibilla |
| 8,260,924 B2 | 9/2012 | Koretz |
| 8,281,061 B2 | 10/2012 | Radke |
| 8,452,819 B1 | 5/2013 | Sorenson, III |
| 8,516,284 B2 | 8/2013 | Chan |
| 8,527,544 B1 | 9/2013 | Colgrove |
| 8,751,763 B1 | 6/2014 | Ramarao |
| 8,819,367 B1 * | 8/2014 | Fallone ............... G06F 11/1456 711/162 |
| 8,825,937 B2 | 9/2014 | Atkisson |
| 8,868,825 B1 | 10/2014 | Hayes |
| 8,904,061 B1 | 12/2014 | O'Brien, III |
| 8,949,208 B1 | 2/2015 | Xu |
| 9,015,561 B1 | 4/2015 | Hu |
| 9,043,545 B2 | 5/2015 | Kimmel |
| 9,088,300 B1 | 7/2015 | Chen |
| 9,092,223 B1 | 7/2015 | Pani |
| 9,129,628 B1 | 9/2015 | Fallone |
| 9,141,176 B1 | 9/2015 | Chen |
| 9,208,817 B1 | 12/2015 | Li |
| 9,213,627 B2 * | 12/2015 | Van Acht ............ G06F 12/0246 |
| 9,280,472 B1 | 3/2016 | Dang |
| 9,280,487 B2 | 3/2016 | Candelaria |
| 9,311,939 B1 | 4/2016 | Malina |
| 9,336,340 B1 | 5/2016 | Dong |
| 9,436,595 B1 | 9/2016 | Benitez |
| 9,529,601 B1 | 12/2016 | Dharmadhikari |
| 9,588,698 B1 | 3/2017 | Karamcheti |
| 9,588,977 B1 | 3/2017 | Wang |
| 9,607,631 B2 | 3/2017 | Rausch |
| 9,671,971 B2 * | 6/2017 | Trika .................... G06F 3/0619 |
| 9,747,202 B1 | 8/2017 | Shaharabany |
| 9,852,076 B1 | 12/2017 | Garg |
| 9,875,053 B2 | 1/2018 | Frid |
| 9,946,596 B2 | 4/2018 | Hashimoto |
| 10,013,169 B2 | 7/2018 | Fisher |
| 10,199,066 B1 | 2/2019 | Feldman |
| 10,229,735 B1 | 3/2019 | Natarajan |
| 10,235,198 B2 | 3/2019 | Qiu |
| 10,268,390 B2 * | 4/2019 | Warfield ............... G06F 3/0655 |
| 10,318,467 B2 | 6/2019 | Barzik |
| 10,361,722 B2 | 7/2019 | Lee |
| 10,437,670 B1 | 10/2019 | Koltsidas |
| 10,642,522 B2 | 5/2020 | Li |
| 10,649,657 B2 | 5/2020 | Zaidman |
| 2001/0032324 A1 | 10/2001 | Slaughter |
| 2002/0010783 A1 | 1/2002 | Primak |
| 2002/0039260 A1 | 4/2002 | Kilmer |
| 2002/0073358 A1 | 6/2002 | Atkinson |
| 2002/0095403 A1 | 7/2002 | Chandrasekaran |
| 2002/0161890 A1 | 10/2002 | Chen |
| 2003/0074319 A1 | 4/2003 | Jaquette |
| 2003/0145274 A1 | 7/2003 | Hwang |
| 2003/0163594 A1 | 8/2003 | Aasheim |
| 2003/0163633 A1 | 8/2003 | Aasheim |
| 2003/0217080 A1 | 11/2003 | White |
| 2004/0010545 A1 | 1/2004 | Pandya |
| 2004/0066741 A1 | 4/2004 | Dinker |
| 2004/0103238 A1 | 5/2004 | Avraham |
| 2004/0143718 A1 | 7/2004 | Chen |
| 2004/0255171 A1 | 12/2004 | Zimmer |
| 2004/0268278 A1 | 12/2004 | Hoberman |
| 2005/0038954 A1 | 2/2005 | Saliba |
| 2005/0097126 A1 | 5/2005 | Cabrera |
| 2005/0149827 A1 | 7/2005 | Lambert |
| 2005/0174670 A1 | 8/2005 | Dunn |
| 2005/0177672 A1 | 8/2005 | Rao |
| 2005/0177755 A1 | 8/2005 | Fung |
| 2005/0195635 A1 | 9/2005 | Conley |
| 2005/0235067 A1 | 10/2005 | Creta |
| 2005/0235171 A1 | 10/2005 | Igari |
| 2006/0031709 A1 | 2/2006 | Hiraiwa |
| 2006/0156012 A1 | 7/2006 | Beeson |
| 2007/0033323 A1 | 2/2007 | Gorobets |
| 2007/0061502 A1 | 3/2007 | Lasser |
| 2007/0101096 A1 | 5/2007 | Gorobets |
| 2007/0283081 A1 | 12/2007 | Lasser |
| 2007/0285980 A1 | 12/2007 | Shimizu |
| 2008/0034154 A1 | 2/2008 | Lee |
| 2008/0065805 A1 | 3/2008 | Wu |
| 2008/0082731 A1 | 4/2008 | Karamcheti |
| 2008/0112238 A1 | 5/2008 | Kim |
| 2008/0301532 A1 | 12/2008 | Uchikawa |
| 2009/0006667 A1 | 1/2009 | Lin |
| 2009/0089544 A1 | 4/2009 | Liu |
| 2009/0113219 A1 | 4/2009 | Aharonov |
| 2009/0183052 A1 | 7/2009 | Kanno |
| 2009/0282275 A1 | 11/2009 | Yermalayeu |
| 2009/0287956 A1 | 11/2009 | Flynn |
| 2009/0307249 A1 | 12/2009 | Koifman |
| 2009/0310412 A1 | 12/2009 | Jang |
| 2010/0031000 A1 | 2/2010 | Flynn |
| 2010/0169470 A1 | 7/2010 | Takashige |
| 2010/0217952 A1 | 8/2010 | Iyer |
| 2010/0229224 A1 | 9/2010 | Etchegoyen |
| 2010/0241848 A1 | 9/2010 | Smith |
| 2010/0321999 A1 | 12/2010 | Yoo |
| 2010/0325367 A1 | 12/2010 | Kornegay |
| 2010/0332922 A1 | 12/2010 | Chang |
| 2011/0031546 A1 | 2/2011 | Uenaka |
| 2011/0055458 A1 | 3/2011 | Kuehne |
| 2011/0055471 A1 | 3/2011 | Thatcher |
| 2011/0072204 A1 | 3/2011 | Chang |
| 2011/0099418 A1 | 4/2011 | Chen |
| 2011/0153903 A1 | 6/2011 | Hinkle |
| 2011/0161784 A1 | 6/2011 | Selinger |
| 2011/0191525 A1 | 8/2011 | Hsu |
| 2011/0218969 A1 | 9/2011 | Anglin |
| 2011/0231598 A1 | 9/2011 | Hatsuda |
| 2011/0239083 A1 | 9/2011 | Kanno |
| 2011/0252188 A1 | 10/2011 | Weingarten |
| 2011/0258514 A1 | 10/2011 | Lasser |
| 2011/0292538 A1 | 12/2011 | Haga |
| 2011/0299317 A1 | 12/2011 | Shaeffer |
| 2011/0302353 A1 | 12/2011 | Confalonieri |
| 2012/0039117 A1 | 2/2012 | Webb |
| 2012/0084523 A1 | 4/2012 | Littlefield |
| 2012/0089774 A1 | 4/2012 | Kelkar |
| 2012/0096330 A1 | 4/2012 | Przybylski |
| 2012/0117399 A1 | 5/2012 | Chan |
| 2012/0147021 A1 | 6/2012 | Cheng |
| 2012/0159099 A1 | 6/2012 | Lindamood |
| 2012/0159289 A1 | 6/2012 | Piccirillo |
| 2012/0173792 A1 | 7/2012 | Lassa |
| 2012/0203958 A1 | 8/2012 | Jones |
| 2012/0210095 A1 | 8/2012 | Nellans |
| 2012/0233523 A1 | 9/2012 | Krishnamoorthy |
| 2012/0246392 A1 | 9/2012 | Cheon |
| 2012/0278579 A1 | 11/2012 | Goss |
| 2012/0284587 A1 | 11/2012 | Yu |
| 2012/0331207 A1 | 12/2012 | Lassa |
| 2013/0013880 A1 | 1/2013 | Tashiro |
| 2013/0024605 A1 | 1/2013 | Sharon |
| 2013/0054822 A1 | 2/2013 | Mordani |
| 2013/0061029 A1 | 3/2013 | Huff |

(56) References Cited

U.S. PATENT DOCUMENTS

| | | |
|---|---|---|
| 2013/0073798 A1 | 3/2013 | Kang |
| 2013/0080391 A1 | 3/2013 | Raichstein |
| 2013/0145085 A1 | 6/2013 | Yu |
| 2013/0145089 A1 | 6/2013 | Eleftheriou |
| 2013/0151759 A1 | 6/2013 | Shim |
| 2013/0159251 A1 | 6/2013 | Skrenta |
| 2013/0159723 A1 | 6/2013 | Brandt |
| 2013/0166820 A1 | 6/2013 | Batwara |
| 2013/0173845 A1 | 7/2013 | Aslam |
| 2013/0191601 A1 | 7/2013 | Peterson |
| 2013/0219131 A1 | 8/2013 | Alexandron |
| 2013/0238955 A1 | 9/2013 | D Abreu |
| 2013/0254622 A1 | 9/2013 | Kanno |
| 2013/0318283 A1 | 11/2013 | Small |
| 2013/0318395 A1 | 11/2013 | Kalavade |
| 2014/0006688 A1 | 1/2014 | Yu |
| 2014/0019650 A1 | 1/2014 | Li |
| 2014/0025638 A1 | 1/2014 | Hu |
| 2014/0082273 A1 | 3/2014 | Segev |
| 2014/0095827 A1 | 4/2014 | Wei |
| 2014/0108414 A1 | 4/2014 | Stillerman |
| 2014/0181532 A1 | 6/2014 | Camp |
| 2014/0195564 A1 | 7/2014 | Talagala |
| 2014/0233950 A1 | 8/2014 | Luo |
| 2014/0250259 A1 | 9/2014 | Ke |
| 2014/0279927 A1 | 9/2014 | Constantinescu |
| 2014/0304452 A1 | 10/2014 | De La Iglesia |
| 2014/0310574 A1 | 10/2014 | Yu |
| 2014/0359229 A1 | 12/2014 | Cota-Robles |
| 2014/0365707 A1 | 12/2014 | Talagala |
| 2015/0019798 A1 | 1/2015 | Huang |
| 2015/0082317 A1 | 3/2015 | You |
| 2015/0106556 A1 | 4/2015 | Yu |
| 2015/0106559 A1 | 4/2015 | Cho |
| 2015/0121031 A1 | 4/2015 | Feng |
| 2015/0142752 A1 | 5/2015 | Chennamsetty |
| 2015/0199234 A1 | 7/2015 | Choi |
| 2015/0227316 A1 | 8/2015 | Warfield |
| 2015/0234845 A1 | 8/2015 | Moore |
| 2015/0269964 A1 | 9/2015 | Fallone |
| 2015/0277937 A1 | 10/2015 | Swanson |
| 2015/0294684 A1 | 10/2015 | Qjang |
| 2015/0301964 A1 | 10/2015 | Brinicombe |
| 2015/0304108 A1 | 10/2015 | Obukhov |
| 2015/0347025 A1 | 12/2015 | Law |
| 2015/0363271 A1 | 12/2015 | Haustein |
| 2015/0363328 A1 | 12/2015 | Candelaria |
| 2015/0372597 A1 | 12/2015 | Luo |
| 2016/0014039 A1 | 1/2016 | Reddy |
| 2016/0026575 A1 | 1/2016 | Samanta |
| 2016/0041760 A1 | 2/2016 | Kuang |
| 2016/0048341 A1 | 2/2016 | Constantinescu |
| 2016/0077749 A1 | 3/2016 | Ravimohan |
| 2016/0077968 A1 | 3/2016 | Sela |
| 2016/0098344 A1 | 4/2016 | Gorobets |
| 2016/0098350 A1 | 4/2016 | Tang |
| 2016/0103631 A1 | 4/2016 | Ke |
| 2016/0110254 A1 | 4/2016 | Cronie |
| 2016/0154601 A1 | 6/2016 | Chen |
| 2016/0155750 A1 | 6/2016 | Yasuda |
| 2016/0162187 A1 | 6/2016 | Lee |
| 2016/0179399 A1 | 6/2016 | Melik-Martirosian |
| 2016/0188223 A1 | 6/2016 | Camp |
| 2016/0188890 A1 | 6/2016 | Naeimi |
| 2016/0203000 A1 | 7/2016 | Parmar |
| 2016/0232103 A1 | 8/2016 | Schmisseur |
| 2016/0239074 A1 | 8/2016 | Lee |
| 2016/0239380 A1 | 8/2016 | Wideman |
| 2016/0274636 A1 | 9/2016 | Kim |
| 2016/0306853 A1 | 10/2016 | Sabaa |
| 2016/0321002 A1 | 11/2016 | Jung |
| 2016/0342345 A1 | 11/2016 | Kankani |
| 2016/0343429 A1 | 11/2016 | Nieuwejaar |
| 2016/0350002 A1 | 12/2016 | Vergis |
| 2016/0350385 A1 | 12/2016 | Poder |
| 2016/0364146 A1 | 12/2016 | Kuttner |
| 2017/0010652 A1 | 1/2017 | Huang |
| 2017/0075583 A1 | 3/2017 | Alexander |
| 2017/0075594 A1 | 3/2017 | Badam |
| 2017/0091110 A1 | 3/2017 | Ash |
| 2017/0109199 A1 | 4/2017 | Chen |
| 2017/0109232 A1 | 4/2017 | Cha |
| 2017/0147499 A1 | 5/2017 | Mohan |
| 2017/0161202 A1 | 6/2017 | Erez |
| 2017/0162235 A1 | 6/2017 | De |
| 2017/0168986 A1 | 6/2017 | Sajeepa |
| 2017/0177217 A1 | 6/2017 | Kanno |
| 2017/0177259 A1 | 6/2017 | Motwani |
| 2017/0199823 A1 | 7/2017 | Hayes |
| 2017/0212708 A1 | 7/2017 | Suhas |
| 2017/0220254 A1 | 8/2017 | Warfield |
| 2017/0221519 A1 | 8/2017 | Matsuo |
| 2017/0228157 A1 | 8/2017 | Yang |
| 2017/0242722 A1 | 8/2017 | Qiu |
| 2017/0249162 A1 | 8/2017 | Tsirkin |
| 2017/0262176 A1 | 9/2017 | Kanno |
| 2017/0262178 A1 | 9/2017 | Hashimoto |
| 2017/0262217 A1 | 9/2017 | Pradhan |
| 2017/0269998 A1 | 9/2017 | Sunwoo |
| 2017/0285976 A1 | 10/2017 | Durham |
| 2017/0286311 A1 | 10/2017 | Juenemann |
| 2017/0322888 A1 | 11/2017 | Booth |
| 2017/0344470 A1 | 11/2017 | Yang |
| 2017/0344491 A1 | 11/2017 | Pandurangan |
| 2017/0353576 A1 | 12/2017 | Guim Bernat |
| 2018/0024772 A1 | 1/2018 | Madraswala |
| 2018/0024779 A1 | 1/2018 | Kojima |
| 2018/0033491 A1 | 2/2018 | Marelli |
| 2018/0052797 A1 | 2/2018 | Barzik |
| 2018/0067847 A1 | 3/2018 | Oh |
| 2018/0074730 A1 | 3/2018 | Inoue |
| 2018/0076828 A1 | 3/2018 | Kanno |
| 2018/0088867 A1 | 3/2018 | Kaminaga |
| 2018/0107591 A1 | 4/2018 | Smith |
| 2018/0113631 A1* | 4/2018 | Zhang .................... G06F 3/064 |
| 2018/0143780 A1 | 5/2018 | Cho |
| 2018/0150640 A1 | 5/2018 | Li |
| 2018/0165038 A1 | 6/2018 | Authement |
| 2018/0167268 A1 | 6/2018 | Liguori |
| 2018/0173620 A1 | 6/2018 | Cen |
| 2018/0188970 A1 | 7/2018 | Liu |
| 2018/0189175 A1* | 7/2018 | Ji ......................... G06F 3/0611 |
| 2018/0189182 A1 | 7/2018 | Wang |
| 2018/0212951 A1 | 7/2018 | Goodrum |
| 2018/0226124 A1 | 8/2018 | Perner |
| 2018/0232151 A1 | 8/2018 | Badam |
| 2018/0270110 A1 | 9/2018 | Chugtu |
| 2018/0293014 A1 | 10/2018 | Ravimohan |
| 2018/0300203 A1 | 10/2018 | Kathpal |
| 2018/0329776 A1 | 11/2018 | Lai |
| 2018/0336921 A1 | 11/2018 | Ryun |
| 2018/0349396 A1 | 12/2018 | Blagojevic |
| 2018/0356992 A1 | 12/2018 | Lamberts |
| 2018/0373428 A1 | 12/2018 | Kan |
| 2018/0373655 A1 | 12/2018 | Liu |
| 2018/0373664 A1 | 12/2018 | Vijayrao |
| 2019/0012111 A1 | 1/2019 | Li |
| 2019/0050327 A1* | 2/2019 | Li ........................ G06F 3/0608 |
| 2019/0065085 A1 | 2/2019 | Jean |
| 2019/0073262 A1 | 3/2019 | Chen |
| 2019/0087089 A1* | 3/2019 | Yoshida .................. G06F 3/061 |
| 2019/0087115 A1 | 3/2019 | Li |
| 2019/0087328 A1 | 3/2019 | Kanno |
| 2019/0171532 A1 | 6/2019 | Abadi |
| 2019/0205206 A1 | 7/2019 | Hornung |
| 2019/0227927 A1 | 7/2019 | Miao |
| 2019/0272242 A1 | 9/2019 | Kachare |
| 2019/0278654 A1 | 9/2019 | Kaynak |
| 2019/0339998 A1 | 11/2019 | Momchilov |
| 2019/0377632 A1 | 12/2019 | Oh |
| 2019/0377821 A1 | 12/2019 | Pleshachkov |
| 2019/0391748 A1 | 12/2019 | Li |
| 2020/0004456 A1 | 1/2020 | Williams |
| 2020/0004674 A1 | 1/2020 | Williams |

(56) References Cited

U.S. PATENT DOCUMENTS

| | | | |
|---|---|---|---|
| 2020/0013458 A1 | 1/2020 | Schreck | |
| 2020/0042223 A1 | 2/2020 | Li | |
| 2020/0089430 A1* | 3/2020 | Kanno | G06F 3/0659 |
| 2020/0097189 A1 | 3/2020 | Tao | |
| 2020/0143885 A1* | 5/2020 | Kim | G06F 3/064 |
| 2020/0159425 A1 | 5/2020 | Flynn | |
| 2020/0326855 A1* | 10/2020 | Wu | G06F 3/0619 |

FOREIGN PATENT DOCUMENTS

| | | |
|---|---|---|
| WO | 9418634 | 8/1994 |
| WO | 1994018634 | 8/1994 |

OTHER PUBLICATIONS

Arpaci-Dusseau et al. "Operating Systems: Three Easy Pieces", Originally published 2015; Pertinent: Chapter 44; flash-based SSDs, available at http://pages.cs.wisc.edu/~remzi/OSTEP/.

Jimenex, X., Novo, D. and P. Ienne, "Pheonix:Reviving MLC Blocks as SLC to Extend NAND Flash Devices Lifetime," Design, Automation & Text in Europe Conference & Exhibition (Date), 2013.

Yang, T. Wu, H. and W. Sun, "GD-FTL: Improving the Performance and Lifetime of TLC SSD by Downgrading Worn-out Blocks," IEEE 37th International Performance Computing and Communications Conference (IPCCC), 2018.

https://web.archive.org/web/20071130235034/http://en.wikipedia.org:80/wiki/logical_block_addressing wikipedia screen shot retriefed on wayback Nov. 20, 2007 showing both physical and logical addressing used historically to access data on storage devices (Year: 2007).

Ivan Picoli, Carla Pasco, Bjorn Jonsson, Luc Bouganim, Philippe Bonnet. "uFLIP-OC: Understanding Flash I/O Patterns on Open-Channel Solid-State Drives." APSys'17, Sep. 2017, Mumbai, India. pp. 1-7, 2017, <10.1145/3124680.3124741>. <hal-01654985>.

EMC Powerpath Load Balancing and Failover Comparison with native MPIO operating system solutions. Feb. 2011.

Tsuchiya, Yoshihiro et al. "DBLK: Deduplication for Primary Block Storage", MSST 2011, Denver, CO, May 23-27, 2011 pp. 1-5.

Chen Feng, et al. "CAFTL: A Content-Aware Flash Translation Layer Enhancing the Lifespan of Flash Memory based Solid State Devices"< FAST '11, San Jose, CA Feb. 15-17, 2011, pp. 1-14.

Wu, Huijun et al. "HPDedup: A Hybrid Prioritized Data Deduplication Mechanism for Primary Storage in the Cloud", Cornell Univ. arXiv: 1702.08153v2[cs.DC], Apr. 16, 2017, pp. 1-14.

WOW: Wise Ordering for Writes—Combining Spatial and Temporal Locality in Non-Volatile Caches by Gill (Year: 2005).

Helen H. W. Chan et al. "HashKV: Enabling Efficient Updated in KV Storage via Hashing", https://www.usenix.org/conference/atc18/presentation/chan, (Year: 2018).

\* cited by examiner

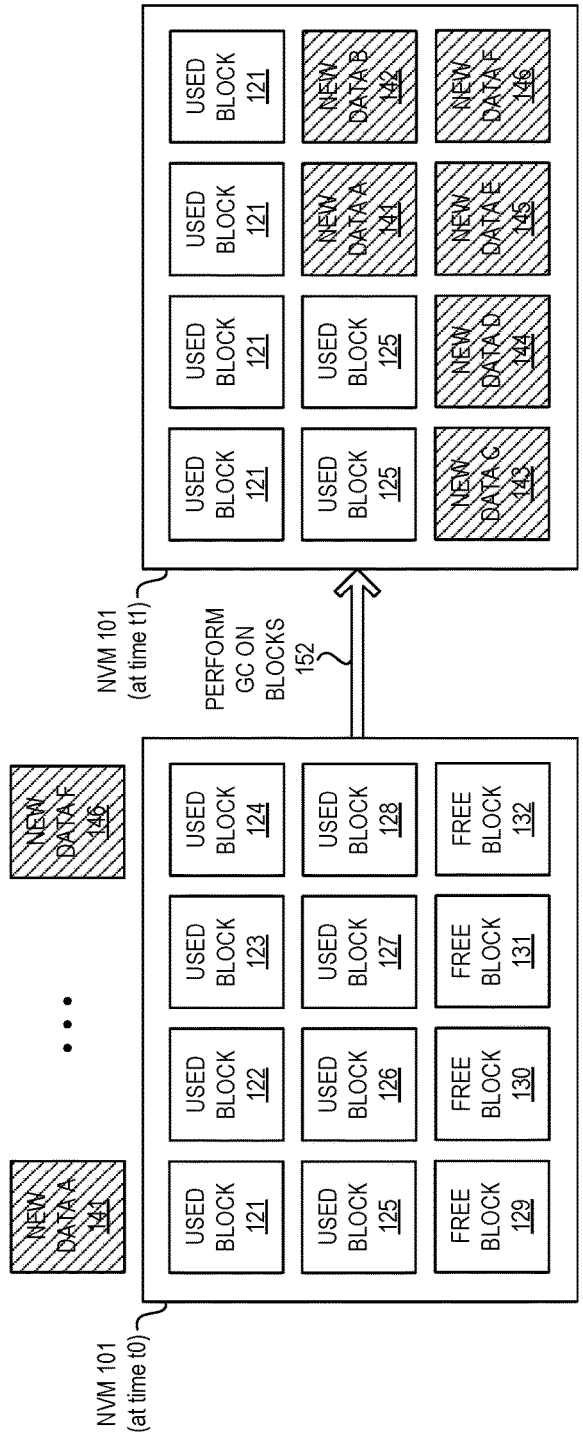
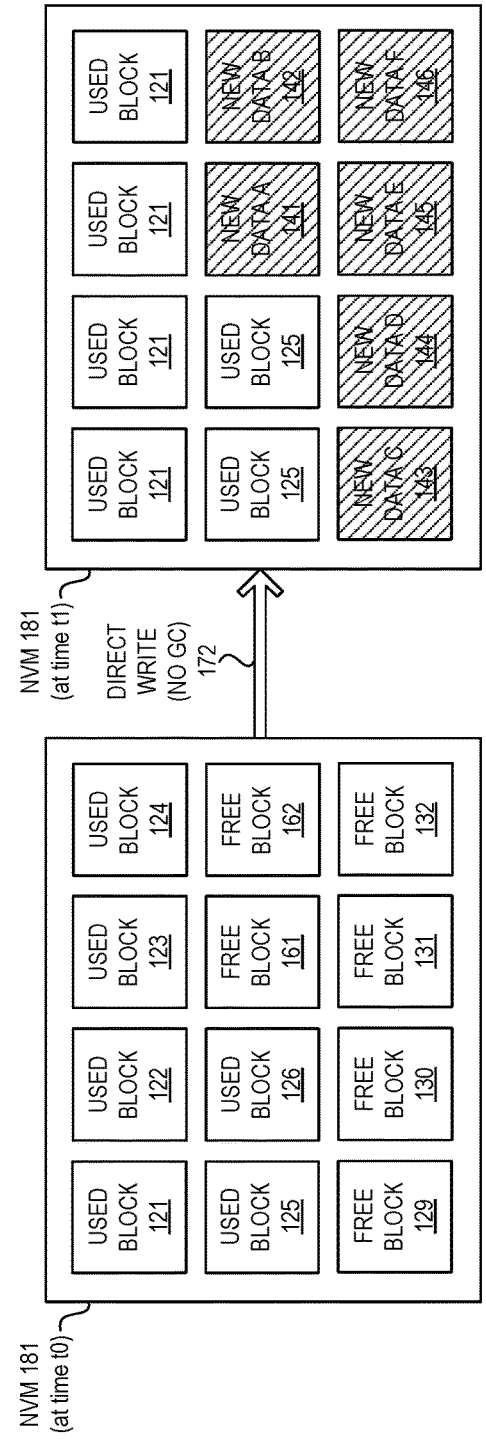
FIG. 1A (PRIOR ART)
FIG. 1B (PRIOR ART)

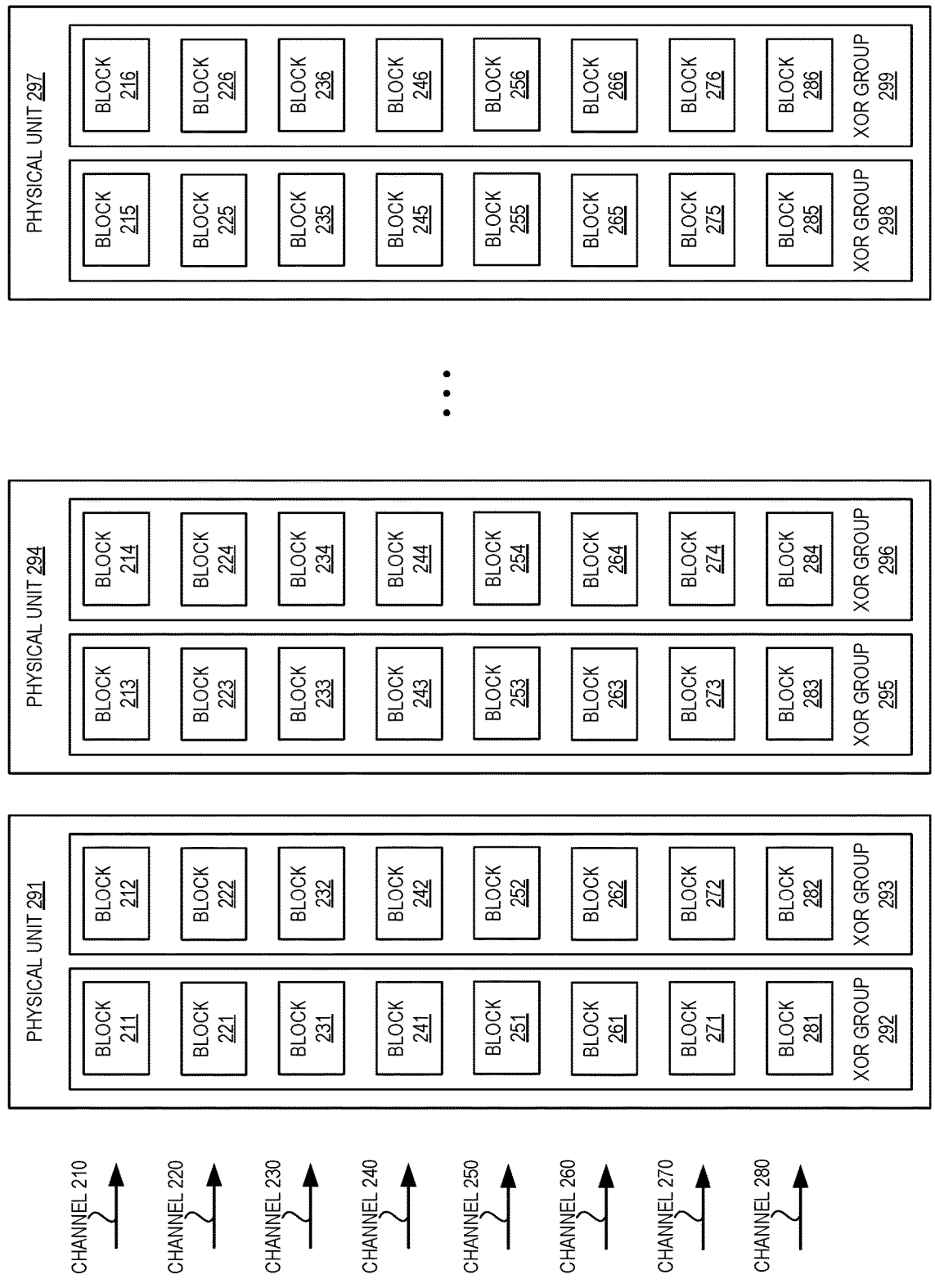

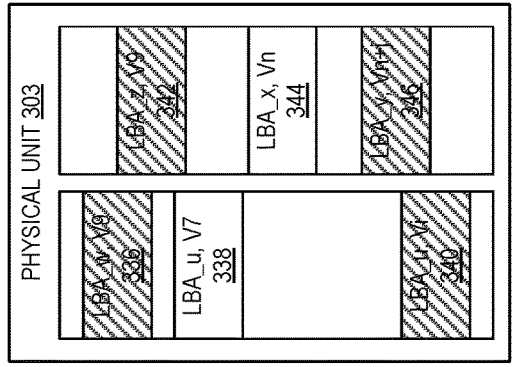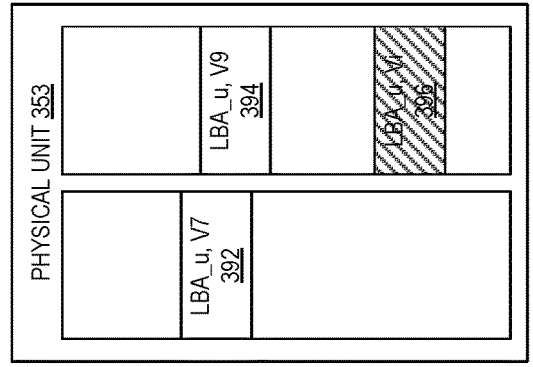
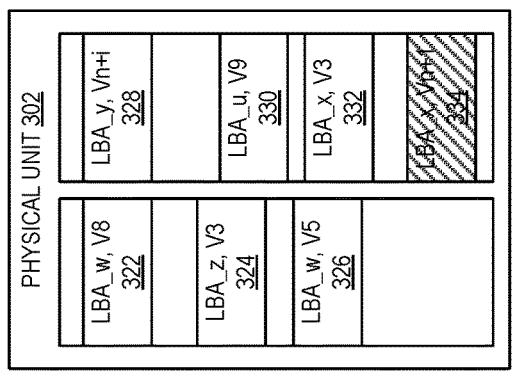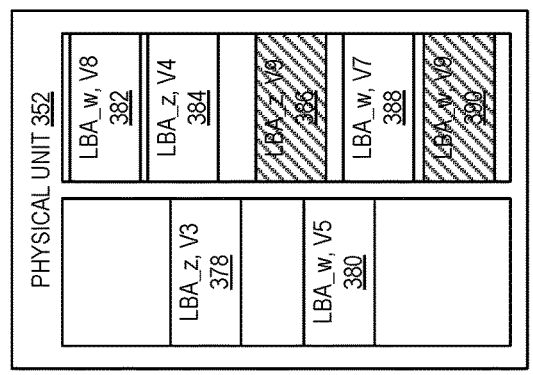
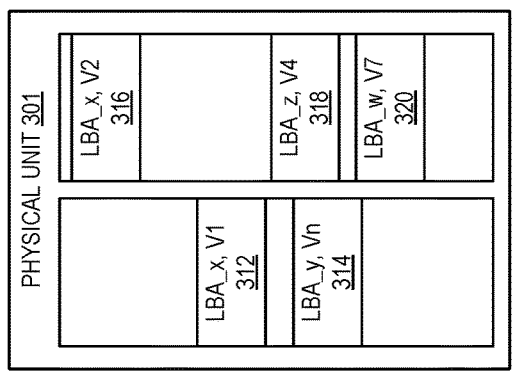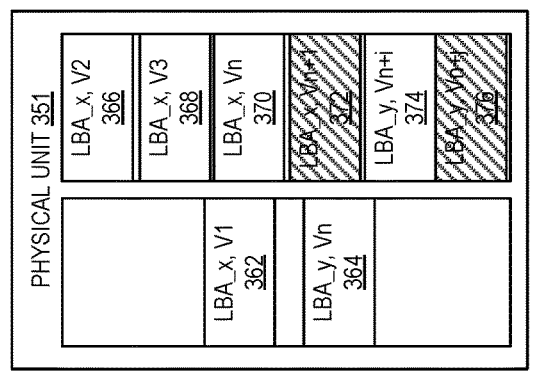
FIG. 3A (PRIOR ART)
FIG. 3B

METHOD AND SYSTEM FOR ORGANIZING NAND BLOCKS AND PLACING DATA TO FACILITATE HIGH-THROUGHPUT FOR RANDOM WRITES IN A SOLID STATE DRIVE

BACKGROUND

Field

This disclosure is generally related to the field of data storage. More specifically, this disclosure is related to a method and system for organizing NAND blocks and placing data to facilitate high-throughput for random writes in a solid state drive.

Related Art

The proliferation of the Internet and e-commerce continues to create a vast amount of digital content. Various distributed storage systems have been created to access and store such digital content. A storage system can include volatile memory (e.g., dynamic random access memory (DRAM)) and multiple drives (e.g., a solid state drive (SSD) with Not-And (NAND) flash memory) or a hard disk drive (HDD)). Conventional systems can optimize the NAND flash in an SSD for a high-throughput based on a sequential write. However, in a random write, the throughput of a NAND-based SSD can be significantly lower (e.g., one magnitude lower) than the throughput for the sequential write. Furthermore, as the Ethernet bandwidth increases (e.g., growing to greater than 100 Gigabytes (GB)), the random write throughput can become the bottleneck for performance in a storage system.

For example, a server equipped with a 100 GB network interface card (NIC) would require tens of SSDs to match the Ethernet throughput. At the same time, SSDs have evolved to include high-capacity Quad-Level Cell (QLC) NAND, such that the storage capacity of a single server can exceed hundreds of Terabytes (TB). If a single server fails, a large amount of data may become unavailable for a non-negligible amount of recovery time. This can result in an inefficient system, inconsistent behavior, and decreased performance for the overall storage system.

SUMMARY

One embodiment provides a system for facilitating data placement. The system receives, by a computing device, data to be written to a non-volatile memory, wherein the data is associated with a first logical block address. The system performs, based on the first logical block address, a search in a mapping table for an entry which indicates a first physical block address associated with a first physical unit. A respective physical unit can comprise a plurality of blocks of data across a plurality of channels of the non-volatile memory. The system writes the data to a second physical block address in the first physical unit. The system updates the entry by replacing the first physical block address with the second physical block address.

In some embodiments, the system determines the second physical block address by selecting an available block in the same first physical unit in which the first physical address resides, wherein a prior version of data corresponding to the first logical block address is stored at the first physical address.

In some embodiments, writing the data to the second physical block address and updating the entry are in response to determining that the entry exists in the mapping table. The system notifies a host of successfully writing the data to the non-volatile memory.

In some embodiments, in response to determining that the entry does not exist in the mapping table: the system writes the data to a third physical block address based on a sequential write; and the system creates, in the mapping table, a new entry which maps the first logical block address to the third physical block address.

In some embodiments, the third physical block address is selected by a flash translation layer module based on a history of channels most recently used to place data in the non-volatile memory.

In some embodiments, the system identifies a second physical unit storing data which is to be erased. The system determines one or more current versions of data in the second physical unit. The system copies out the current versions of data to a third physical unit. The system erases the data stored in the second physical unit.

In some embodiments, determining the one or more current versions of data in the second physical unit comprises performing a search in the mapping table for one or more physical block addresses in the second physical unit which correspond to a most recent version of data for a given logical block address.

In some embodiments, the data to be written is associated with a plurality of logical block address. The system determines that the data associated with the plurality of logical block addresses is successfully written to the first physical unit and one or more other physical units of the non-volatile memory. In response to detecting that a predetermined period of time has passed: the system fills the first physical unit with dummy data; and the system marks the first physical unit as sealed.

BRIEF DESCRIPTION OF THE FIGURES

FIG. 1A illustrates an exemplary environment for facilitating data placement, including a conventional amount of overprovisioning and frequent garbage collection, in accordance with the prior art.

FIG. 1B illustrates an exemplary environment for facilitating data placement, including an increased amount of overprovisioning and reduced garbage collection, in accordance with the prior art.

FIG. 2 illustrates an exemplary environment for facilitating data placement, including data stored in physical units across a plurality of channels, in accordance with an embodiment of the present application.

FIG. 3A illustrates an exemplary data placement and updating of prior versions, in accordance with the prior art.

FIG. 3B illustrates an exemplary data placement and updating of prior versions, in accordance with an embodiment of the present application.

In the figures, like reference numerals refer to the same figure elements.

DETAILED DESCRIPTION

Figure 4A:
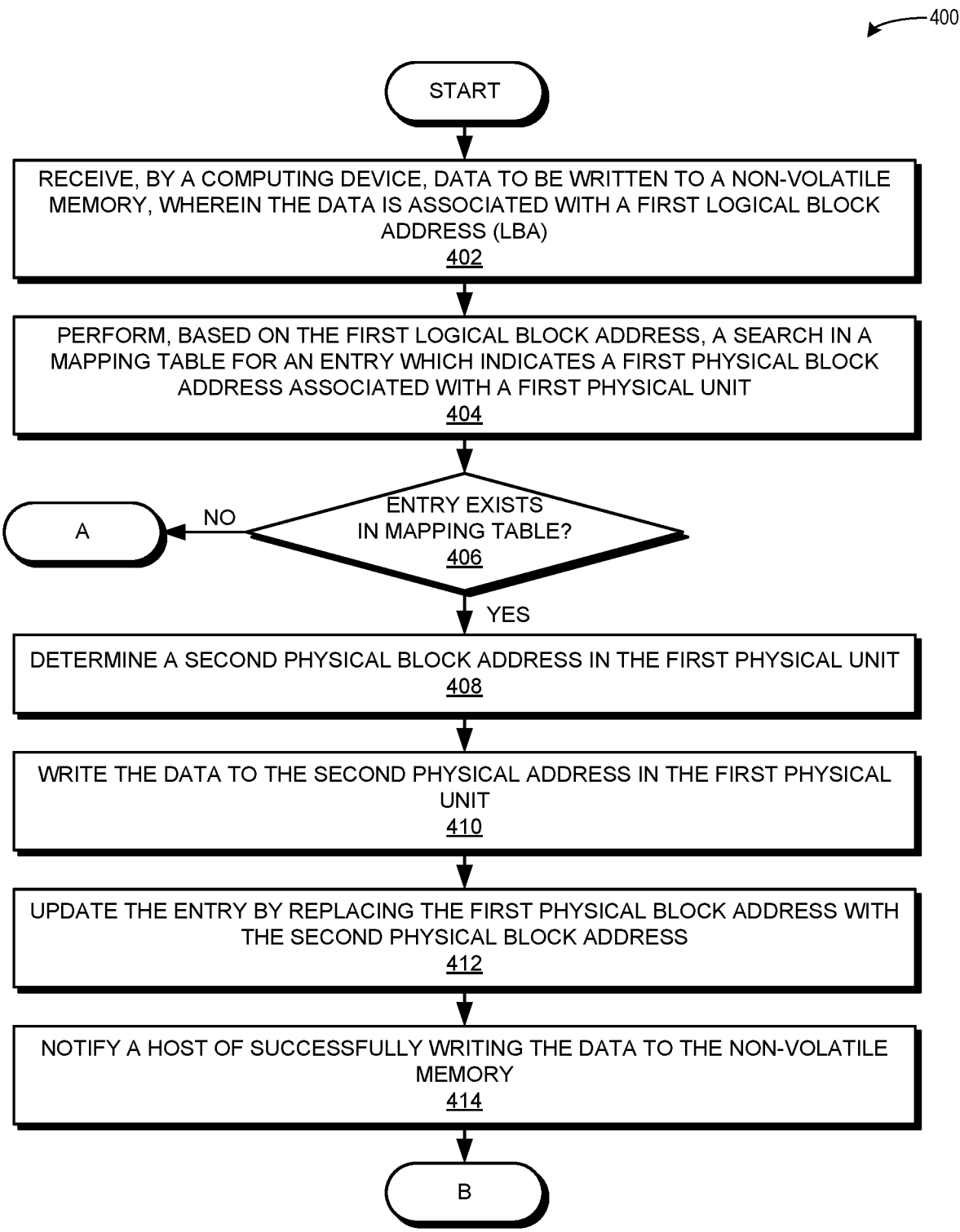
FIG. 4A presents a flowchart illustrating a method for facilitating data placement, in accordance with an embodiment of the present application.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

OVERVIEW

The embodiments described herein solve the bottleneck resulting from the throughput of a random write in a NAND-based SSD by dividing NAND locations into physical units and placing updates to previously stored data in a same physical unit, which allows the SSD to expend fewer resources in performing garbage collection.

As described above, the random write throughput in a NAND-based SSD can become the bottleneck for performance in a storage system. In a random write, certain data associated with certain logical block addresses (LBAs) may be frequently updated (e.g., "hot data"). In general, a flash translation layer (FTL) module can place data in the non-volatile memory based on a timing sequence of when data with a certain LBA is received by the SSD. However, if the placed data corresponds to an update for data which has been previously stored in the non-volatile memory, this may cause a write amplification, as there may be many old or expired versions of the data stored in various physical locations of the non-volatile memory. This can result in the SSD expending a significant amount of resources to perform garbage collection (e.g., because the various expired versions may reside in different areas marked for recycling and copying out at different times, as described below in relation to FIG. 3A).

Furthermore, the mismatch between the increase of Ethernet bandwidth and the increase of storage capacity can result in a performance bottleneck in the throughput of a random write operation. For example, a server equipped with a 100 GB NIC would require tens of SSDs to match the Ethernet throughput. At the same time, the high storage capacity of, e.g., a QLC NAND, can result in the storage capacity of a single server exceeding hundreds of Terabytes (TB). When a single server fails, a huge amount of data may become unavailable for a non-negligible amount of recovery time. This can result in an inefficient system, inconsistent behavior, and decreased performance for the overall storage system.

Current solutions to address these issues with the random write throughput involve increasing the overprovisioning (OP) of the SSD, which can result in more free blocks to accommodate incoming data and a reduction in triggering of garbage collection. Reducing the triggering of garbage collection can result in an improved write performance in the SSD. However, given a random write, a single data sector can be updated multiple times before the corresponding physical locations are recycled. For example, a small-size data sector can exist in the NAND flash with multiple expired versions in different NAND blocks before those multiple expired versions can be recycled, and over time, any free blocks may become occupied. When a garbage collection process is triggered, various valid data may need to be copied out before a physical location can be recycled. This can lead to an inefficient and limited gain on performance. An example of overprovisioning in the prior art is described below in relation to FIG. 1.

The embodiments described herein address these challenges and constraints by dividing NAND locations into physical units and placing updates to previously stored data in a same physical unit, which allows the SSD to expend fewer resources in performing garbage collection. A physical unit can include a plurality of data blocks across a plurality of channels of the NAND flash, as described below in relation to FIG. 2. By placing updates to already-existing data in the same physical unit as prior versions of the data, the system can achieve a reduced triggering of garbage collection, which can lead to an improved performance in the random write throughput, as described below in relation to FIG. 3B. The system can provide more consistent behavior and performance in a distributed storage system, and can result in an improved throughput for a random write operation in a NAND-based SSD, which can also result in improving the overall efficiency and performance of the distributed storage system.

A "storage server" or a "storage node" refers to a computing device which can include multiple storage drives. A distributed storage system can include multiple storage servers. A "storage drive" refers to a device or a drive with a non-volatile memory which can provide persistent storage of data, e.g., a solid state drive (SSD) or a hard disk drive (HDD).

A "physical unit" refers to a unit which includes data blocks across a plurality of NAND channels. A physical unit can include multiple groups of data blocks, and a group of data blocks in a physical unit can form an "Exclusive OR group" or an "XOR group." An XOR group refers to a group of data blocks which can provide consistency and protection of the stored data in the event that a given data block of the XOR group fails or cannot be accessed (e.g., due to a failure of the NAND die on which the given data block of the XOR group resides).

"Overprovisioning" refers to including additional storage capacity in an SSD, which can result in distributing the total number of writes and erases across a larger number of NAND flash blocks over time. For example, a manufacturer can reserve an additional percentage of the total capacity of a drive for overprovisioning, which can both improve the performance and increase the endurance of the SSD.

Exemplary Environment for Data Placement in the Prior Art

FIG. 1A illustrates an exemplary environment for facilitating data placement, including a conventional amount of overprovisioning and frequent garbage collection, in accordance with the prior art. FIG. 1A depicts new data (such as new data A 141 to new data F 146) as "incoming data" to be stored in a non-volatile memory (NVM) 101 (at time t0), which includes used blocks 121-128 and free blocks 129-132. NVM 101 (at time t0) indicates a regular amount of overprovisioned blocks (i.e., "overprovisioning" or OP). In writing the incoming data (141-146) to the non-volatile memory, the system must perform garbage collection on the blocks (via a function 152) in order to free up sufficient space to store the incoming data, resulting in non-volatile memory 101 (at time ti). That is, the system can perform a garbage collection process on used blocks 127 and 128, resulting in new data A 141 and new data B 142 stored in the newly erased locations of previous used blocks 127 and 128.

NVM 101 depicts a regular amount of OP, which can result in a frequently triggered garbage collection. When garbage collection is triggered, the system can copy out pages storing valid data to other physical locations. This copy operation can consume the internal bandwidth of an SSD, which can reduce the amount of resources available to handle an incoming host write. Thus, reducing the frequency of triggering garbage collection can improve the write performance of an SSD in terms of high throughput and high reliability.

One current solution to reduce the frequency of garbage collection is to increase the amount of OP. FIG. 1B illustrates an exemplary environment for facilitating data placement, including an increased amount of overprovisioning and reduced garbage collection, in accordance with the prior art. In FIG. 1B, a non-volatile memory (NVM) 181 (at time t0) includes used blocks 121-126 and free blocks 161, 162, and 129-132. NVM 181 (at time t0) indicates an increased amount of OP (as compared to NVM 101 (at time t0)). In writing the incoming data (141-146) to the non-volatile memory, in FIG. 1B, the system need not perform garbage collection on the blocks. Instead, because of the additional space available through the increased OP, the system can perform a direct write of the incoming data (141-146) (via a function 172), resulting in NVM 181 (at time ti).

Thus, the increased OP of FIG. 1B allows for sufficient free blocks to accommodate an incoming write without triggering garbage collection and recycling blocks, which allows the host data to be written directly to the NAND flash with the full resources of the SSD and without the interference of internal data movement caused by the frequently triggered garbage collection. This in turn can lead to an improved performance in the random write throughput.

However, in the case of a random write operation, challenges can arise because a single data sector may be updated multiple times (resulting in multiple expired versions) prior to erasure of the corresponding physical locations for the multiple expired versions. For example, given a small-sized I/O data (such as 4 Kilobytes), a conventional system may place the small-sized data evenly onto active channels, where a single small-sized data may be updated soon after it is recently written to a non-volatile memory. Thus, a small sector of data can exist in the NAND flash as multiple expired versions stored across different NAND blocks before the garbage collection process can recycle each of the different NAND blocks. As a result, free or OP blocks may gradually become occupied. By increasing the OP, the system may attain an improvement in performance, but the challenge of optimizing efficiency still remains. That is, the system may adjust by increasing to a higher percentage of OP, but the system is still limited in a gain in performance because the many small-size sectors are randomly located in the non-volatile memory and cannot be recycled in a timely manner.

Exemplary Environment for Facilitating Data Placement Using Physical Units Across a Plurality of Channels The embodiments described herein address the above-described challenges by providing a system which uses a limited amount of OP in an SSD to mitigate the write amplification associated with random write operations, and thus results in an improved random write throughput. The system uses a user-managed flash translation layer to place updates to existing data into a same physical unit which stores prior versions of the data, by spreading each physical unit across multiple NAND flash channels. Each physical unit can also include a plurality of XOR groups for protection and consistency of the data.

During operation, when the system receives an incoming write request, the system can evaluate the logical block address (LBA) of the incoming data to determine whether the write is associated with an update, e.g., by performing a search for a corresponding valid entry in a mapping table managed by a flash translation layer (FTL) module. If a valid entry exists, the system can place the incoming write into the same physical unit as the prior version(s) of data corresponding to the same LBA, as described below in relation to FIGS. 3B and 4A. By placing updates in the same physical unit as prior expired versions, the system can eliminate the chaos of multiple "holes" created across different NAND blocks resulting from random write operations. This allows all expired versions of data corresponding to a single LBA to be erased or recycled as a whole physical unit, which can result in an improved overall storage system.

FIG. 2 illustrates an exemplary environment 200 for facilitating data placement, including data stored in physical units across a plurality of channels, in accordance with an embodiment of the present application. Environment 200 can depict a non-volatile memory which includes a plurality of physical units, such as physical units 291, 294, and 297. Each physical unit can include a plurality of XOR groups, and each XOR group can include data blocks across a plurality of channels of the non-volatile memory. For example, physical unit 291 can include XOR groups 292 and 293. XOR group 292 can include blocks 211, 221, 231, 241, 251, 261, 271, and 281, which are spread or accessed across, respectively, the plurality of channels 210, 220, 230, 240, 250, 260, 270, and 280. An example comparing the conventional method to the environment of and the physical units depicted in FIG. 2 is described below in relation to FIGS. 3A and 3B.

Exemplary Data Placement and Updating of Prior Versions in the Prior Art Vs. Writing Updated Versions to the Same Physical Unit FIG. 3A illustrates an exemplary data placement and updating of prior versions, in accordance with the prior art. In FIG. 3, the challenge of multiple expired versions of small-size sectors across multiple physical units is depicted, e.g., the "holes" formed by the expired versions in the different physical NAND blocks cannot be recycled efficiently. In order to recycle the blocks depicted in FIG. 3A, with the many random holes scattered throughout the NAND blocks, the system must copy out a significant amount of valid data, which consumes the overall bandwidth of the SSD, increases the write amplification, and, consequently, decreases the performance and lifespan of the SSD.

FIG. 3A depicts several physical units 301, 302, and 303, which each include data sectors or blocks corresponding to multiple versions of multiple data. These multiple versions spread across all the physical units can include both previous expired versions as well as a most recent or current version. The most recent or current version for a given LBA is indicated as shaded with diagonally right-slanting lines. For example, given data with an LBA of "x": a version 1 (LBA_x, V1 312) can be stored on physical unit 301 in a first group and a version 2 (LBA_x, V2 316) can be stored on physical unit 301 in a second group; a version 3 (LBA_x, V3 332) can be stored on physical unit 302 in a first group and a version n+1 (LBA_x, Vn+1 334; the most recent version as indicated by the diagonally right-slanting lines) can be stored on physical unit 302 in a second group; and a version n (LBA_x, Vn 344) can be stored on physical unit 303. Similarly, for data with LBAs of "w," "y," and "z" (e.g., LBA_w, LBA_y, and LBA_z), multiple versions of data corresponding to those LBAs are stored across the plurality of physical units in FIG. 3A. When performing garbage collection, the system of FIG. 3A may encounter difficulty in recycling the multiple NAND blocks, as the expired versions stored across the multiple physical units can consume the bandwidth and resources of the SSD, as previously described, especially as the system continues to seek free NAND blocks to perform a random write.

In contrast, FIG. 3B illustrates an exemplary data placement and updating of prior versions, in accordance with an embodiment of the present application. In FIG. 3B, the system places multiple versions of data corresponding to the same LBA in the same physical unit. By gathering and storing the expired versions together in this manner, the system can reduce the cost of garbage collection, i.e., reduce the triggering frequency of garbage collection, which can lead to an improved performance in the throughput of a random write operation.

In FIG. 3B, physical unit 351 includes data corresponding to LBAs "x" and "y," and also includes both multiple prior expired and the most recent or current versions corresponding to those respective LBAs. For LBA x, physical unit 351 includes versions 1, 2, 3, n, and n+1 as, respectively: LBA_x, V1 362; LBA_x, V2 366; LBA_x, V3 368; LBA_x, Vn 370; and LBA_x, Vn+1 372. Similarly, for LBA_y, physical unit 351 includes versions n, n+i, and n+j as, respectively: LBA_y, Vn 364; LBA_y, Vn+i 374; and LBA_y, Vn+j 376. When the system determines that a garbage collection process is to be performed on physical unit 351 (e.g., that physical unit 351 is to be recycled), only the most recent version of data corresponding to LBAs x and y need to be copied out (i.e.: LBA_x, Vn+1 372; and LBA_y, Vn+j 376). This allows the system to subsequently erase and recycle the entirety of physical unit 351 by copying out only a minimal number of valid blocks, as opposed to leaving the multiple expired versions of data sitting and spread across multiple NAND blocks waiting to be recycled and taking up crucial space (as described above in relation to FIG. 3A).

Thus, by reducing the amount of internal write operations based on the reduced triggering of garbage collection, the system can provide an improved throughput for random write operations, which can result in a more efficient overall storage system, as described herein.

Exemplary Method for Facilitating Data Placement

FIG. 4A presents a flowchart 400 illustrating a method for facilitating data placement, in accordance with an embodiment of the present application. During operation, the system receives, by a computing device, data to be written to a non-volatile memory, wherein the data is associated with a first logical block address (LBA) (operation 402). The system performs, based on the first logical block address, a search in a mapping table for an entry which indicates a first physical block address associated with a first physical unit (operation 404). In some embodiments, a respective physical unit comprises a plurality of blocks of data across a plurality of channels of the non-volatile memory. The mapping table may be maintained and/or searched by a flash translation layer (FTL) module of the computing device. If the entry does not exist in the mapping table (decision 406) (i.e., indicating that the data to be written is new data for which an entry has not previously been created), the operation continues at Label A of FIG. 4A.

If the entry exists in the mapping table (decision 406) (i.e., indicating that the data to be written is an update to data already stored in the non-volatile memory), the system determines a second physical block address in the first physical unit (operation 408). For example, the system selects an available block in the same physical unit as the indicated first physical block address returned from the mapping table search. The system writes the data to the second physical address in the first physical unit (operation 410). The system updates the entry by replacing the first physical block address with the second physical block address (operation 412) (e.g., the FTL module updates the mapping table). The system notifies a host of successfully writing the data to the non-volatile memory (operation 414), and the operation continues at Label B of FIG. 4B.

Figure 4B:
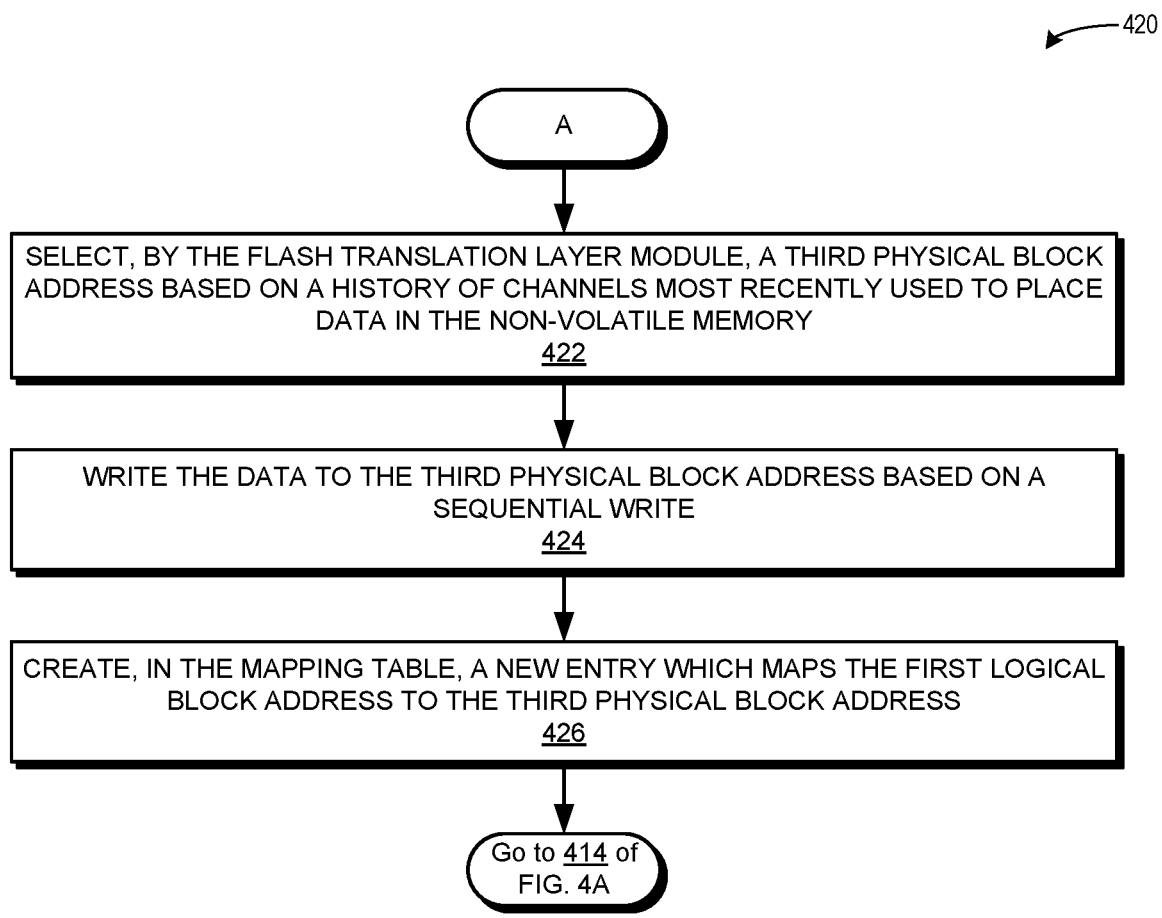
FIG. 4B presents a flowchart illustrating a method for facilitating data placement, in accordance with an embodiment of the present application.

FIG. 4B presents a flowchart illustrating a method 420 for facilitating data placement, in accordance with an embodiment of the present application. The system selects, by the flash translation layer module, a third physical block address based on a history of channels most recently used to place data in the non-volatile memory (operation 422). The system writes the data to the third physical block address based on a sequential write (operation 424). The system creates, in the mapping table, a new entry which maps the first logical block address to the third physical block address (operation 426), and the operation continues at operation 414 of FIG. 4A.

Figure 5:
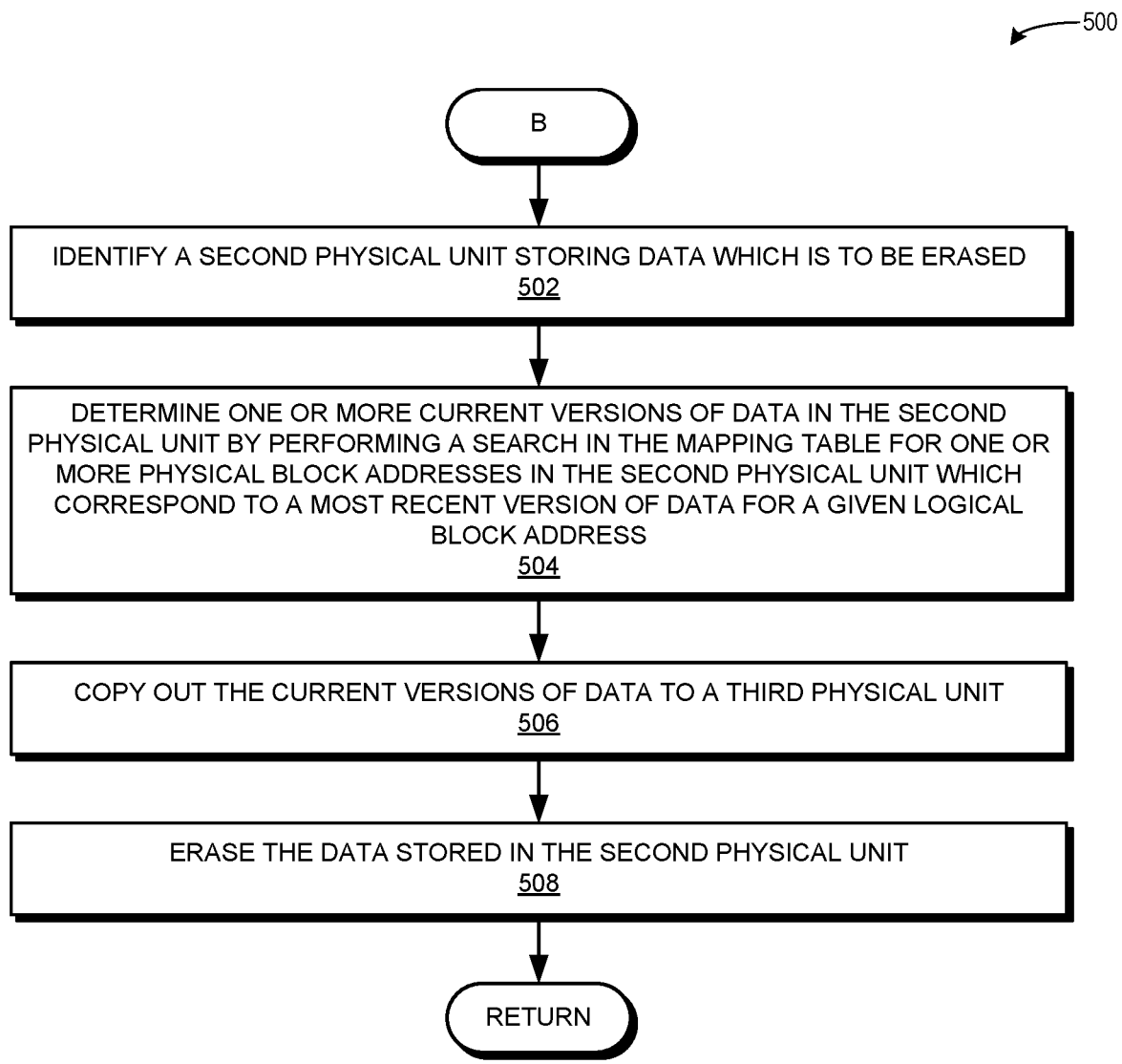
FIG. 5 presents a flowchart illustrating a method for facilitating a garbage collection process, in accordance with an embodiment of the present application.

FIG. 5 presents a flowchart illustrating a method 500 for facilitating a garbage collection process, in accordance with an embodiment of the present application. During operation, the system identifies a second physical unit storing data which is to be erased (operation 502). The system determines one or more current versions of data in the second physical unit by performing a search in the mapping table for one or more physical block addresses in the second physical unit which correspond to a most recent version of data for a given logical block address (operation 504). The system copies out the current versions of data to a third physical unit (operation 506). The system erases the data stored in the second physical unit (operation 508), and the operation returns.

Exemplary Computer System and Apparatus

Figure 6:
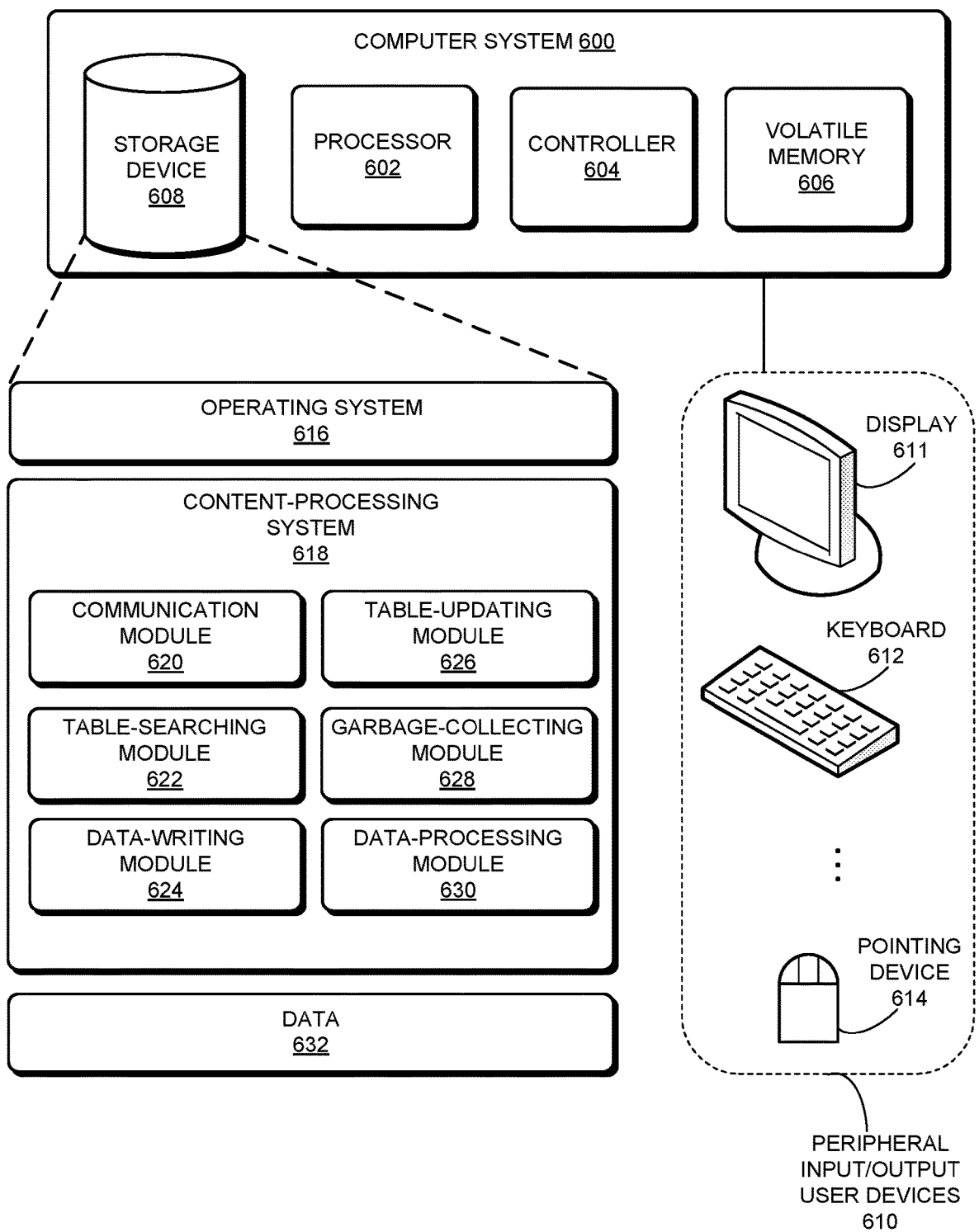
FIG. 6 illustrates an exemplary computer system and storage device that facilitates data placement, in accordance with an embodiment of the present application.

FIG. 6 illustrates an exemplary computer system that facilitates data placement, in accordance with an embodiment of the present application. Computer system 600 includes a processor 602, a controller 604, a volatile memory 606, and a storage device 608. Volatile memory 606 can include, e.g., random access memory (RAM), that serves as a managed memory, and can be used to store one or more memory pools. Storage device 608 can include persistent storage which can be managed or accessed via controller 604. Furthermore, computer system 600 can be coupled to peripheral input/output (I/O) user devices 610, e.g., a display device 611, a keyboard 612, and a pointing device 614. Storage device 608 can store an operating system 616, a content-processing system 618, and data 632.

Content-processing system 618 can include instructions, which when executed by computer system 600, can cause computer system 600 to perform methods and/or processes described in this disclosure. Specifically, content-processing system 618 can include instructions for receiving and transmitting data packets, including data to be read or written, an input/output (I/O) request (e.g., a read request or a write request), and data associated with an I/O request (communication module 620).

Content-processing system 618 can include instructions for receiving, by a computing device, data to be written to a non-volatile memory, wherein the data is associated with a first logical block address (communication module 620). Content-processing system 618 can include instructions for performing, based on the first logical block address, a search in a mapping table for an entry which indicates a first physical block address associated with a first physical unit (table-searching module 622). Content-processing system 618 can include instructions for writing the data to a second physical block address in the first physical unit (data-writing module 624). Content-processing system 618 can include instructions for updating the entry by replacing the first physical block address with the second physical block address (table-updating module 626).

Content-processing system 618 can include instructions for determining whether the entry exists in the mapping table (table-searching module 622). Content-processing system 618 can include instructions for identifying a second physical unit storing data which is to be erased (garbage-collecting module 628). Content-processing system 618 can include instructions for determining one or more current versions of data in the second physical unit table (table-searching module 622). Content-processing system 618 can include instructions for copying out the current versions of data to a third physical unit (data-writing module 624). Content-processing system 618 can include instructions for erasing the data stored in the second physical unit (data-processing module 630).

Data 632 can include any data that is required as input or generated as output by the methods and/or processes described in this disclosure. Specifically, data 632 can store at least: data; a request; a read request; a write request; an input/output (I/O) request; data associated with a read request, a write request, or an I/O request; a logical block address (LBA); a physical block address (PBA); an indicator of a physical unit or a channel; an XOR group; a mapping table; an entry in a mapping table; a prior, previous, or expired version of data corresponding to a first LBA; a most recent or current version of data corresponding to the first LBA; an available block; a notification indicating a successful write operation; a new entry; a sequential write; a random write; an indicator of a flash translation layer module; a physical unit storing data which is to be erased; dummy data; an indicator or marking that data is to be recycled; and an indicator or marking that a physical unit is to be or is sealed.

Figure 7:
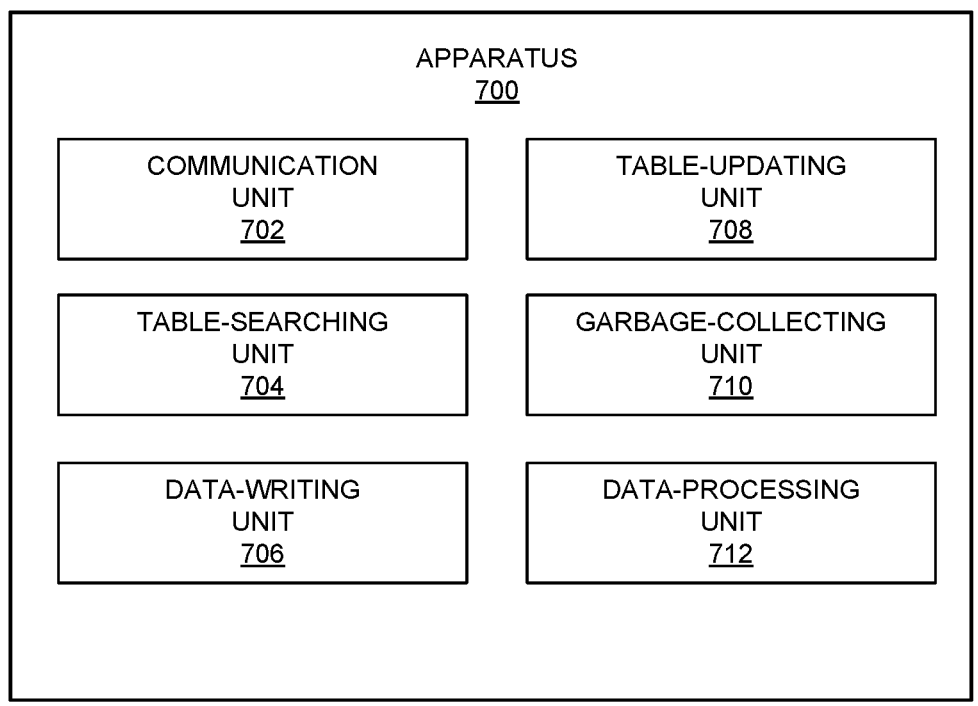
FIG. 7 illustrates an exemplary apparatus that facilitates data placement, in accordance with an embodiment of the present application.

FIG. 7 illustrates an exemplary apparatus that facilitates data placement, in accordance with an embodiment of the present application. Apparatus 700 can comprise a plurality of units or apparatuses which may communicate with one another via a wired, wireless, quantum light, or electrical communication channel. Apparatus 700 may be realized using one or more integrated circuits, and may include fewer or more units or apparatuses than those shown in FIG. 7. Further, apparatus 700 may be integrated in a computer system, or realized as a separate device(s) which is/are capable of communicating with other computer systems and/or devices. Specifically, apparatus 700 can comprise units 702-712 which perform functions or operations similar to modules 620-630 of computer system 600 of FIG. 6, including: a communication unit 702; a table-searching unit 704; a data-writing unit 706; a table-updating unit 708; a garbage-collecting unit 710; and a data-processing unit 712.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-implemented method for facilitating data placement, the method comprising:
   receiving, by a computing device, data to be written to a non-volatile memory which is divided into a plurality of physical units,
   wherein a respective physical unit comprises a plurality of Exclusive OR (XOR) groups,
   wherein a respective XOR group includes a plurality of blocks of data,
   wherein the plurality of blocks of data in the respective XOR group are accessed via a plurality of channels of the non-volatile memory, and
   wherein the data is associated with a first logical block address;
   performing, based on the first logical block address, a search in a mapping table for an entry which indicates a first physical block address associated with a first physical unit, wherein the first physical block address corresponds to a first block in a first XOR group of the first physical unit, and wherein the first block is accessed via a first channel of the plurality of channels;
   determining a second physical block address by selecting an available block in the same first physical unit associated with the first physical block address, wherein the second physical block address corresponds to a second block in the first XOR group of the first physical unit, and wherein a prior version of data corresponding to the first logical block address is stored at the first physical address;
   writing the data to the second physical block address corresponding to the second block in the first XOR group of the first physical unit via a second channel of the plurality of channels; and
   updating the entry by replacing the first physical block address with the second physical block address.

2. The method of claim 1, wherein writing the data to the second physical block address and updating the entry are in response to determining that the entry exists in the mapping table, and wherein the method further comprises:
  notifying a host of successfully writing the data to the non-volatile memory.

3. The method of claim 1, wherein in response to determining that the entry does not exist in the mapping table, the method further comprises:
  writing the data to the third physical block address based on a sequential write; and
  creating, in the mapping table, a new entry which maps the first logical block address to a third physical block address.

4. The method of claim 3, wherein the third physical block address is selected by a flash translation layer module based on a history of channels most recently used to place data in the non-volatile memory.

5. The method of claim 1, further comprising:
  identifying a second physical unit storing data which is to be erased;
  determining one or more current versions of data in the second physical unit;
  copying out the current versions of data to a third physical unit; and
  erasing the data stored in the second physical unit.

6. The method of claim 5, wherein determining the one or more current versions of data in the second physical unit comprises:
  performing a search in the mapping table for one or more physical block addresses in the second physical unit which correspond to a most recent version of data for a given logical block address.

7. The method of claim 1, wherein the data to be written is associated with a plurality of logical block address, and wherein the method further comprises:
  determining that the data associated with the plurality of logical block addresses is successfully written to the first physical unit and one or more other physical units of the non-volatile memory; and
  in response to detecting that a predetermined period of time has passed:
    filling the first physical unit with dummy data; and
    marking the first physical unit as sealed.

8. A computer system for facilitating data placement, the system comprising:
  a processor; and
  a memory coupled to the processor and storing instructions, which when executed by the processor cause the processor to perform a method, wherein the computer system is a storage device, the method comprising:
  receiving, by the computer system, data to be written to a non-volatile memory which is divided into a plurality of physical units,
  wherein a respective physical unit comprises a plurality of Exclusive OR (XOR) groups,
  wherein a respective XOR group includes a plurality of blocks of data,
  wherein the plurality of blocks of data in the respective XOR group are accessed via a plurality of channels of the non-volatile memory, and
  wherein the data is associated with a first logical block address;
  performing, based on the first logical block address, a search in a mapping table for an entry which indicates a first physical block address associated with a first physical unit, wherein the first physical block address corresponds to a first block in a first XOR group of the first physical unit, and wherein the first block is accessed via a first channel of the plurality of channels;
  determining a second physical block address by selecting an available block in the same first physical unit associated with the first physical block address, wherein the second physical block address corresponds to a second block in the first XOR group of the first physical unit, and wherein a prior version of data corresponding to the first logical block address is stored at the first physical address;
  writing the data to the second physical block address corresponding to the second block in the first XOR group of the first physical unit via a second channel of the plurality of channels; and
  updating the entry by replacing the first physical block address with the second physical block address.

9. The computer system of claim 8, wherein writing the data to the second physical block address and updating the entry are in response to determining that the entry exists in the mapping table, and wherein the method further comprises:
  notifying a host of successfully writing the data to the non-volatile memory.

10. The computer system of claim 8, wherein in response to determining that the entry does not exist in the mapping table, the method further comprises:
  writing the data to the third physical block address based on a sequential write; and
  creating, in the mapping table, a new entry which maps the first logical block address to a third physical block address.

11. The computer system of claim 10, wherein the third physical block address is selected by a flash translation layer module based on a history of channels most recently used to place data in the non-volatile memory.

12. The computer system of claim 8, wherein the method further comprises:
  identifying a second physical unit storing data which is to be erased;
  determining one or more current versions of data in the second physical unit;
  copying out the current versions of data to a third physical unit; and
  erasing the data stored in the second physical unit.

13. The computer system of claim 12, wherein determining the one or more current versions of data in the second physical unit comprises:
  performing a search in the mapping table for one or more physical block addresses in the second physical unit which correspond to a most recent version of data for a given logical block address.

14. The computer system of claim 8, wherein the data to be written is associated with a plurality of logical block address, and wherein the method further comprises:
  determining that the data associated with the plurality of logical block addresses is successfully written to the first physical unit and one or more other physical units of the non-volatile memory; and
  in response to detecting that a predetermined period of time has passed:
    filling the first physical unit with dummy data; and
    marking the first physical unit as sealed.

15. A non-transitory computer-readable storage medium storing instructions that when executed by a computer cause the computer to perform a method, the method comprising:

receiving, by the computer, data to be written to a non-volatile memory which is divided into a plurality of physical units, wherein a respective physical unit comprises a plurality of Exclusive OR (XOR) groups, wherein a respective XOR group includes a plurality of blocks of data, wherein the plurality of blocks of data in the respective XOR group are accessed via a plurality of channels of the non-volatile memory, and wherein the data is associated with a first logical block address;

performing, based on the first logical block address, a search in a mapping table for an entry which indicates a first physical block address associated with a first physical unit, wherein the first physical block address corresponds to a first block in a first XOR group of the first physical unit, and wherein the first block is accessed via a first channel of the plurality of channels;

determining a second physical block address by selecting an available block in the same first physical unit associated with the first physical block address, wherein the second physical block address corresponds to a second block in the first XOR group of the first physical unit, and wherein a prior version of data corresponding to the first logical block address is stored at the first physical address;

writing the data to the second physical block address corresponding to the second block in the first XOR group of the first physical unit via a second channel of the plurality of channels; and updating the entry by replacing the first physical block address with the second physical block address.

16. The storage medium of claim 15, wherein writing the data to the second physical block address and updating the entry are in response to determining that the entry exists in the mapping table, and wherein the method further comprises:

notifying a host of successfully writing the data to the non-volatile memory.

17. The storage medium of claim 15, wherein the method further comprises:

identifying a second physical unit storing data which is to be erased;

determining one or more current versions of data in the second physical unit;

copying out the current versions of data to a third physical unit; and erasing the data stored in the second physical unit.

* * * * *